UNITED STATES PATENT OFFICE.

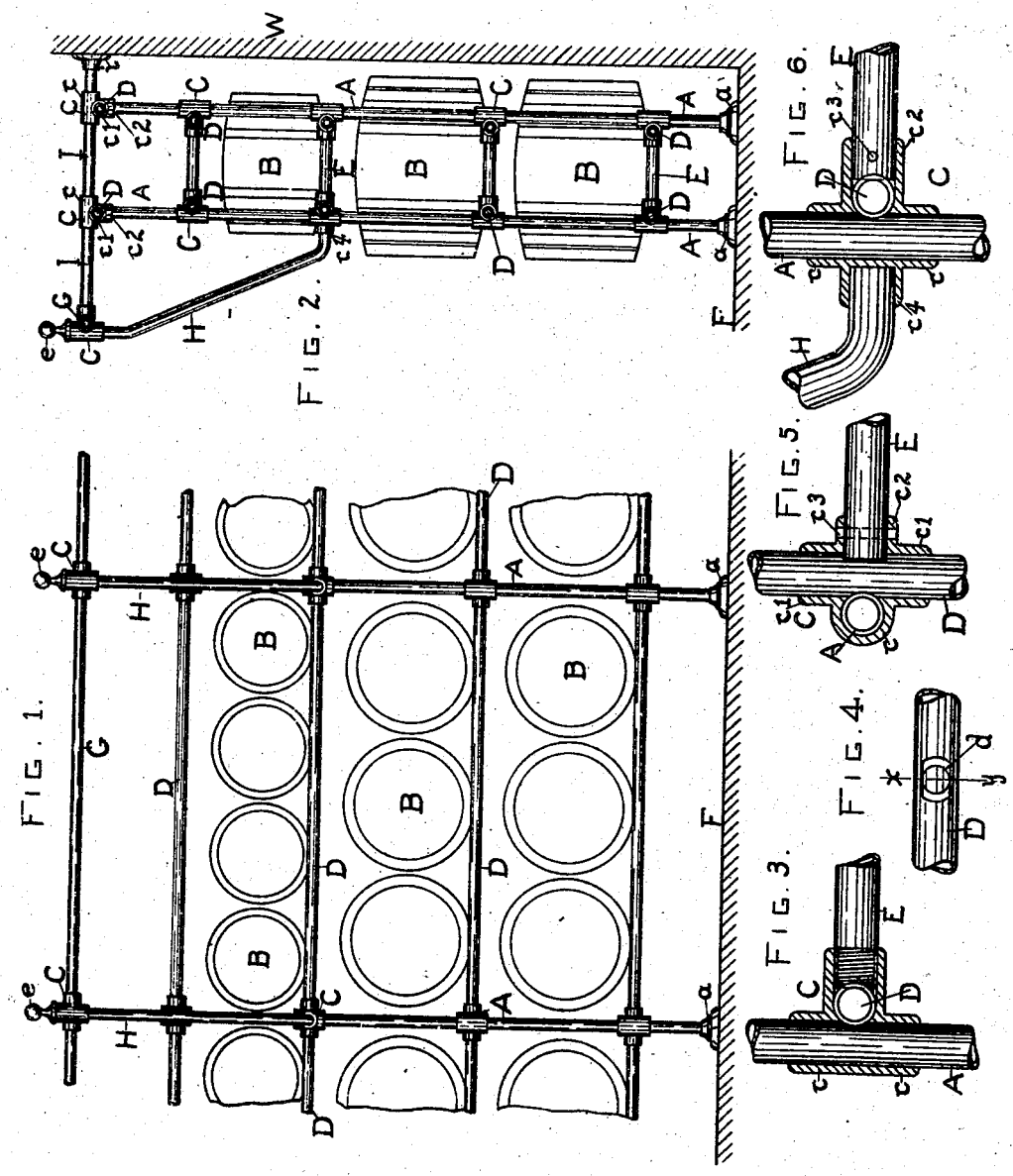

JOHN HEBERLING, OF ROCHESTER, NEW YORK.

RACK.

No. 840,696.  Specification of Letters Patent.  Patented Jan. 8, 1907.

Application filed August 27, 1906. Serial No. 332,141.

*To all whom it may concern:*

Be it known that I, JOHN HEBERLING, a citizen of the United States, residing at Rochester, in the county of Monroe and State of New York, have invented a new and Improved Rack, of which the following is a specification.

This invention relates to racks such as may advantageously be used for supporting or storing goods, preferably such as barrels or kegs containing liquids.

The purpose of my invention is to provide a more efficient and economical construction for such a rack and one which may be readily constructed or extended or added to when desired without the necessity for skilled labor. Such racks as heretofore constructed are usually formed of gas or steam pipes threaded into suitable couplings, each piece being threaded at each end into a coupling with right and left hand threads. In assembling such a rack the threads have to be started simultaneously at each end of each piece of pipe, and this is sometimes difficult to do, as in the case of large pipes where several connecting-pieces of nearly or quite the same length are used to connect parts of the rack. All of such pieces have to have their threads started in engagement simultaneously at each end in order that the rack when assembled will have all parts in suitable alinement.

Another object of my invention is to do away, to a large extent at least, with threads on the pipes and in the parts connecting them.

In carrying out my invention I provide a series of vertical pipes comprising the front and rear standards, each located in a separate plane, and also two series of horizontally-arranged pipes, each series correspondingly located in a separate plane comprising the front and rear horizontal supporting members of the rack. For connecting each vertical series of tubes with its corresponding horizontal series I make use of couplings having members arranged, preferably, at right angles to each other and bored to receive such vertical and horizontal pipes in a sliding fit, the vertical bores in such couplings intersecting somewhat with the horizontal bores. The vertical pipes or standards are notched at the proper distance apart on their opposing faces, and the couplings are inserted thereover with the horizontal bores opposite the notches in the vertical pipes, and the horizontal pipes are then inserted in place and supported from such vertical pipes by engaging the same at such notches. Suitable horizontal connecting members are provided at right angles with the first-named horizontal members and adapted to engage such first-named horizontal pipes and hold them in place in the couplings and against longitudinal movement therein, such last-named connecting-pipes comprising, preferably, means for securing together the front and rear sections of the rack. While I have shown in the drawings these connecting-pipes for securing the front and rear sections of the rack together as threaded into the couplings, still I have also shown only in detail view another method for securing such connecting-pieces in place, and I do not limit myself to any particular method for making such connections. The above-mentioned couplings I have found may be used very successfully for securing and supporting tubes extending outwardly at the top of the rack and carrying in turn a longitudinally-arranged horizontal tube adapted to receive a suitable tackle-block with ropes therein for raising the barrels, so that they may be swung into their proper place in the completed rack.

The accompanying drawings, illustrating that embodiment of my present invention comprising a rack adapted to supporting and storing barrels or kegs, are as follows: Figure 1 is a front or face view of one of the central sections of such a rack and shows also a portion of an adjacent section on each side thereof. Fig. 2 is an end elevation of the parts seen in Fig. 1. Fig. 3 is a vertical central section through one of the couplings used in my rack. Fig. 4 shows in side view the method of notching the horizontal supporting-tubes of my rack to receive the engaging ends of the connecting-tubes. Fig. 5 shows a central horizontal sectional view of one of such couplings, and in this figure also the pipe for connecting the front and rear sections of the rack is shown as secured in place by means of a pin. Fig. 6 shows in a view similar to that seen in Fig. 3 one of my couplings modified to receive the lower end of the brace for supporting the extension-bar seen at the top of the rack.

Similar letters refer to similar parts throughout the several views.

Referring to the drawings, my rack comprises a series of continuous vertical standards A, comprising the front standards and the rear standards for the rack. These standards terminate at their lower ends in base-pieces $a$, by means of which they may be suitably secured to the floor F. A series of couplings C are provided, each comprising intersecting tubular members $c$ and $c'$. The members $c$ are bored to receive the standards A with a sliding fit. The members $c'$ are similarly bored to receive with a sliding fit the horizontal tubes D, comprising the horizontal supporting-tubes of my rack. The bores of the sections $c$ and $c'$ of the couplings C intersect each other, necessitating that one of the tubes entering such bores be notched to receive the other.

The standards A have notches formed therein in their opposing sides, as indicated in Figs. 3, 5, and 6, to receive the horizontal tubes D. These couplings C have also extensions thereon, $c^2$, adapted to receive the ends of the connecting-tubes E. Such tubes E may be threaded into the extensions $c^2$ of the couplings C, in which case, of course, opposite ends of each tube will be threaded with right and left hand threads, and the correspondingly front and rear couplings C of the rack will have their extensions $c^2$ thereon internally threaded with right and left hand threads to receive such connecting-tubes E, or such connecting-tubes E may be secured in the extensions $c^2$ therefor in the couplings C by means of pins $c^3$, as indicated in Figs. 5 and 6.

The tubes D are each notched, as indicated at $d$ in Fig. 4, to receive the ends of the connecting-tubes E. In the arrangement shown in the drawings the central coupling C on each of the front standards A has an additional extension thereon, $c^4$, which is bored to receive the lower end of the brace H, the upper end of which is secured in the couplings C and is notched to receive the tube G in the same way that the standards A are notched to receive the tubes D, and through the members $c'$ on these same couplings there extends such tube G, which in turn is notched in the same way that the tubes D are, as seen at $d$ in Fig. 4, to receive the outer ends of the tubes I. The members $c$ of the couplings C (seen at the upper ends of the standards D) are secured thereon, preferably by threaded connections, such as illustrated in Fig. 3 and already described in reference to the connection between similar couplings C and the connecting-tubes E. The upper horizontal tubes D, as indicated in Fig. 2, extend through the members $c'$ of these couplings C, threaded on the upper ends of the standards A, and it is desirable that these uppermost tubes D have notches therein properly spaced longitudinally and on their upper surfaces to permit of the insertion of the tubes I, and such tubes D will of course be correspondingly notched on their under surfaces after the manner indicated at $d$ in Fig. 4 to receive the upper ends of the standards A, and they will thus constitute means for holding properly spaced the upper ends of such standards A. The tubes D are notched on their upper surfaces, as above noted, to permit the tubes I to slide longitudinally through the uppermost couplings C. This is necessary in order that after the upper ends of the braces H have been inserted in the couplings C and held therein by the tube G, being inserted in such couplings thereafter, and the tubes I, also secured in such couplings, the lower ends of the brace H may be inserted within the extensions $c^4$, provided therefor in the outer surfaces of the central couplings C, secured on the front standards A by the sliding of the tubes I within and through the couplings C, secured on the upper ends of the standards A. The tube I has secured upon the end thereof next to the wall W a flange $i$, by means of which such tube may be secured to the wall, and, if desired, the tubes I may be prevented from longitudinal movement through the couplings C (seen at the upper ends of the standards A and A') by means of set-screws. (Not shown.) When desired, terminal ornaments $e$, as seen, may be inserted in the exposed openings of any of the couplings C.

In assembling my rack first the members $c$ of the couplings C are inserted over the standards A, which of course have first been suitably notched to receive and engage the pipes D. Then the pipes D are inserted through the openings therefor in the members $c'$ of the couplings C, previously moved to the proper position to permit such insertion of the pipes D in engagement with the notches therefor in the standards A. Then the members $c^2$ of the uppermost couplings C are inserted over the upper ends of the standards A and screwed down part way. Then the uppermost pipes D are inserted in the members $c'$ of such uppermost couplings C, and the standards A are then screwed to place in the couplings C, engaging the notches on the under sides of such uppermost pipes D, provided to receive such upper ends of the standards A, or, if desired, such uppermost couplings C may be secured on the upper ends of such standards A by means of pins in the manner already described. The members $c$ of the couplings C on the upper ends of corresponding front and rear ones of such standards A are alined to receive the pipes I, such pipes I then constituting means for holding the front and rear sections of my rack first at the desired distance apart to facilitate the insertion one by one of the connecting-pipes E just far enough to secure an engagement of such pipes E at each end when such pipes are threaded into the couplings C, with which they connect. The connecting-pipes E are thereupon screwed up to place. This is to be done, however, only after the pipes D have been turned so that the notches d therein will be properly engaged by the ends of the connecting-pipes E, and at this same time also the lower ends of the standards A will be adjusted longitudinally of the rack to bring the couplings C thereon properly in alinement with the notches d in the pipes D. The upper ends of the braces H are then inserted in the members c of the upper and outermost couplings C therefor. Then the tube G is inserted through the members c' in such couplings and such couplings properly spaced thereon, so that the notches in such tube G, similar to those seen at d in Fig. 4, shall come opposite the openings in such couplings for the tubes I, which are then screwed or otherwise secured in place. Such tubes I are then inserted through the openings therefor in the couplings C at the upper ends of the standards A and the flanges i secured thereon. Then the tubes I are moved to the rear through the couplings C at the upper ends of the standards A, causing the lower ends of the braces H to enter the openings therefor in the members c⁴ on the central couplings C on the front standards A. Ornaments, as e, may be inserted in the open end of any of the couplings C.

In using my rack a suitable tackle-block may be suspended from the tube G and may be operated in the usual way to raise the barrels B to the proper height, when they may be swung into position within the rack and upon the desired pair of the supporting-pipes D, in doing which any suitable accessories, such as beveled bars or trucks, may be used, as desired. Such bars or trucks forming no part of my present invention are not herein shown and described.

It will of course be understood that in long racks the horizontal pipes extending longitudinally of the rack must necessarily comprise several pieces, in which case the joints in such pipes will come within the couplings C, and the abutting ends of such pipes D will be notched when brought together, as indicated in Fig. 4, the same as though such pipes were one continuous pipe. The dotted line x y in Fig. 4 indicates the division-line between two such abutting ends of two sections of the pipe D. The portion of each of such abutting-sections of pipe D contained within the circular channel notched therein to receive the ends of a pipe E comprises when engaged by the ends of such pipe E, means for firmly holding such abutting ends together, and thus uniting the several sections of the rack together longitudinally. It will of course be understood, however, that it is desirable that the joints in the horizontal pipes be broken—that is, that no two adjacent longitudinally-arranged horizontal pipes have joints therein located at the couplings on the same pair of the front or rear standards A. After the pipes I have been properly secured in place the flanges i are secured to the wall W, and the base-pieces a of the standards A may be secured to the floor F.

When it is desired to extend a rack built in accordance with my invention, it is only necessary that the ends of the horizontal bars D at the end of the rack as already built up be so cut off that the ends of such bars may abut against the ends of the similar bars in the new and extended portion, as indicated in Fig. 4, and within the couplings C. When a rack is built and it is expected that additions thereto will be necessary, the horizontal bars D may be cut off, as indicated in Fig. 4, so as to come opposite the centers of the couplings C, and in the open ends of such couplings there may be inserted ornaments, such as e, until such addition or extension to the rack is erected.

What I claim is—

1. A rack comprising a series of prismatic standards and a series of horizontally-disposed prismatic bars arranged to receive the articles to be supported, a series of couplings each having a member provided with an opening adapted to receive such standards with a sliding fit and provided also with a member having an opening adapted to receive such horizontal bars with a sliding fit, such standards notched to receive such horizontal bars and such couplings adapted to hold such horizontal bars when in position therein in engagement with such notches therefor in such standards, such couplings also provided with members having openings therein adapted to receive suitable transverse bars, such horizontal bars notched to receive the ends of such transverse bars and means for holding such transverse bars in the members therefor in such couplings and in engagement with the notches therefor in such horizontal bars.

2. A rack comprising a front and a rear series of prismatic standards and a correspondingly front and rear series of horizontally-disposed prismatic bars arranged to receive the articles to be supported, a series of couplings each having a member provided with an opening adapted to receive such standards with a sliding fit and provided also with a member having an opening adapted to receive such horizontal bars with a sliding fit, such standards notched to receive such horizontal bars and such couplings adapted to hold such horizontal bars when in position therein in engagement with such notches therefor in such standards, such couplings also provided with members having openings therein adapted to receive suitable connecting-bars adapted to connect such front and rear series of standards and horizontal bars together, such horizontal bars notched to receive the ends of such connecting-bars and means for holding such connecting-bars in the members therefor in such couplings and in engagement with the notches therefor in such horizontal bars.

3. In a rack, a series of standards, a series of horizontal bars, couplings each carrying a member having an opening therein adapted to engage one of such standards with a sliding fit and also a member having an opening therein adapted to engage one of such horizontal bars with a sliding fit, such standards notched and such couplings adapted to hold such horizontal bars in engagement with the notches in such standards, such couplings each having also a member adapted to receive a bar extending outwardly therefrom approximately at right angles to such standards and to such horizontal bars, such horizontal bars having notches therein adapted to be engaged by the ends of such last-named bars and means for holding such last-named bars in such openings therefor in such couplings with the ends thereof in engagement with such notches therefor in such horizontal bars.

4. As a means for holding three prismatic elements together, a coupling carrying first and second members having openings therethrough adapted to receive such first and second elements with a sliding fit, the openings in such members of such coupling intersecting with each other and the first element having a notch therein adapted to receive the second element when such first and second elements are in position in such coupling, such coupling carrying a third member having an opening therein adapted to receive the third element, such second element having a notch therein adapted to receive and be engaged by the end of such third element and means for holding such third element in the opening therefor in such coupling and with its end in engagement with the notch therefor in such second element.

5. As a means for holding two prismatic elements together, a coupling carrying a member having an opening therein adapted to receive the first of such elements therein with a sliding fit and also carrying a member adapted to receive such second element, such first element having a notch adapted to be engaged by the end of such second element and means for holding such second element in position in the member therefor on such coupling and with the end thereof in engagement with the notch therefor in such first element.

6. As a means for holding the abutting ends of two prismatic elements together, a coupling adapted to receive the abutting ends of such elements with a sliding fit, a member carried by such coupling adapted to receive a transversely-disposed member, such transverse member recessed in its end, such prismatic members notched to receive the recessed end of such transverse members.

JOHN HEBERLING.

Witnesses
LAWRENCE G. McGREAL,
LOTTIE WOOD.